United States Patent
McFalls et al.

[11] Patent Number: 5,870,816
[45] Date of Patent: Feb. 16, 1999

[54] METHOD OF ASSEMBLING A TONGUE ASSEMBLY FOR USE WITH A SEAT BELT SYSTEM

[75] Inventors: Bob L. McFalls, Shelby Township; Charles E. Steffens, Jr., Washington, both of Mich.

[73] Assignee: TRW Vehicle Safety Systems Inc., Lyndhurst, Ohio

[21] Appl. No.: 858,229

[22] Filed: May 19, 1997

[51] Int. Cl.$^6$ .............................. B23P 11/00; A44B 11/00
[52] U.S. Cl. ................................ 29/434; 29/434; 29/464; 24/170
[58] Field of Search ......................... 29/434, 464; 24/170, 24/193, 197

[56] References Cited

U.S. PATENT DOCUMENTS

| | | |
|---|---|---|
| 1,234,818 | 7/1917 | Sturrock . |
| 2,845,674 | 8/1958 | Pearson . |
| 3,213,503 | 10/1965 | Carter et al. . |
| 3,390,436 | 7/1968 | Prete Jr. . |
| 4,876,770 | 10/1989 | Bougher . |
| 5,058,244 | 10/1991 | Fernandez . |
| 5,100,176 | 3/1992 | Ball et al. . |
| 5,138,749 | 8/1992 | McCune et al. . |
| 5,222,278 | 6/1993 | Ball et al. . |

*Primary Examiner*—Paul T. Sewell
*Assistant Examiner*—Jila Mohandesi
*Attorney, Agent, or Firm*—Tarolli, Sundheim, Covell, Tummino & Szabo

[57] ABSTRACT

A tongue assembly (10) is movable along seat belt webbing (16) and includes a latch plate sub-assembly (74) for engaging a buckle (26). A cinch bar (130) is carried by the latch plate sub-assembly (74) for pivotal movement relative to the latch plate sub-assembly between a disengaged position enabling the seat belt webbing and the latch plate sub-assembly to move relative to one another and an engaged position clamping the seat belt webbing against the latch plate sub-assembly. A method of assembling the tongue assembly (10) comprises the step of inserting a first end (138) of the cinch bar (130) into a first opening (128) in the latch plate sub-assembly (74) by movement of the cinch bar in a first direction (C). A second end (139) of the cinch bar (130) is inserted into a second opening (129) spaced away from the first opening (128) in the latch plate sub-assembly (74) by movement of the cinch bar in a second direction (E) opposite the first direction (C). The first end (138) of the cinch bar (130) is maintained in the first opening (128) while the second end (139) of the cinch bar is inserted in the second opening (129).

15 Claims, 4 Drawing Sheets

METHOD OF ASSEMBLING A TONGUE ASSEMBLY FOR USE WITH A SEAT BELT SYSTEM

BACKGROUND OF THE INVENTION

1. Technical Field

The present invention relates to a method of assembling a tongue assembly for use in a vehicle seat belt system to help restrain movement of an occupant of a vehicle or of a child seat in a vehicle.

2. Description of the Prior Art

A known vehicle seat belt system is a three-point continuous loop seat belt system. A three-point continuous loop seat belt system includes a seat belt retractor and a length of belt webbing. The belt webbing extends from the retractor through a D-ring fixed to the vehicle and then down to an anchor point near the vehicle floor. A tongue assembly is slidable along the length of belt webbing between the D-ring and the anchor point. To use the seat belt system, a vehicle occupant grasps the tongue assembly and inserts it into a buckle. When the tongue assembly is fastened in the buckle, a portion of the belt webbing extends across the lap of the vehicle occupant and a portion of the belt webbing extends diagonally across the torso of the vehicle occupant. When the tongue assembly is released from the buckle, the belt webbing is wound onto the retractor.

The tongue assembly should slide along the belt when the occupant moves the tongue assembly toward the buckle. The tongue assembly should also slide along the belt after the occupant unlocks the tongue assembly from the buckle so that the retractor can fully wind up the belt. The retractor would otherwise carry the tongue assembly upwardly to the D-ring, whereupon further movement of the belt would be prevented as the D-ring blocked further movement of the tongue assembly. Conversely, when the subject tongue assembly is locked in the buckle, it should cinch the belt webbing, that is, block movement of the belt webbing through the tongue assembly. This cinching action helps to restrain movement of the vehicle occupant in the event of a vehicle collision, and helps to secure a child seat in position on the vehicle seat. This cinch device is designed to cinch the webbing up to a predetermined load. Loads above the predetermined load may cause the webbing to translate but the occupant is still restrained.

SUMMARY OF THE INVENTION

The present invention is directed to a method of assembling a tongue assembly. The tongue assembly is movable along seat belt webbing and includes a latch plate sub-assembly for engaging a buckle and a cinch bar carried by the latch plate sub-assembly for pivotal movement relative to the latch plate sub-assembly between a disengaged position enabling the seat belt webbing and the latch plate sub-assembly to move relative to one another and an engaged position clamping the seat belt webbing against the latch plate sub-assembly. The method comprises the steps of inserting a first end of the cinch bar into a first opening in the latch plate sub-assembly by movement of the cinch bar in a first direction. A second end of the cinch bar is inserted into a second opening spaced away from the first opening in the latch plate sub-assembly. Movement of the cinch bar in a second direction opposite the first direction causes the cinch bar to be retained in the tongue assembly. The cinch bar is maintained in the latch plate sub-assembly by the seat belt webbing. Once retained in the latch plate sub-assembly by the seat belt webbing, the cinch bar can not be removed without breaking the parts. This design eliminates a separate pivot pinch for the cinch bar which is in the prior art.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

The present invention relates to a method of assembling a tongue assembly for use in a vehicle seat belt system for helping to restrain movement of an occupant of the vehicle or of a child seat in the vehicle.

Figure 1:
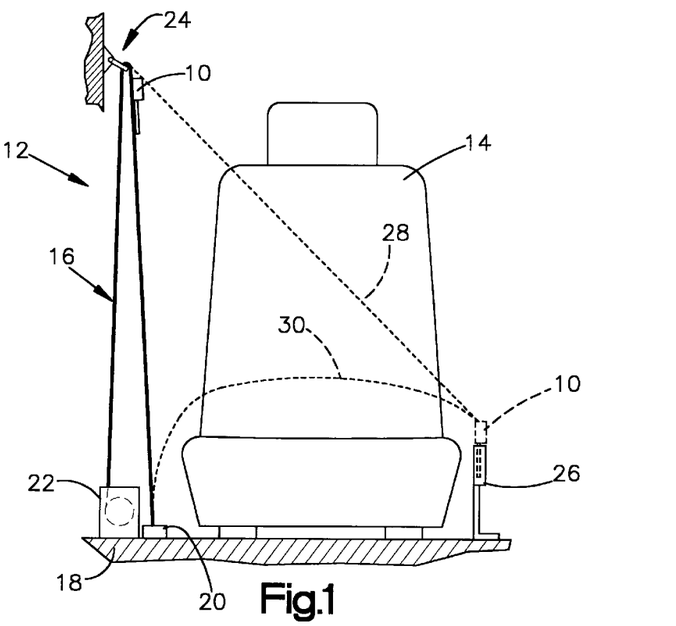
FIG. 1 is a schematic illustration of a vehicle seat belt system including a tongue assembly in accordance with the present invention.

FIG. 1 illustrates a tongue assembly 10 incorporated in a three-point continuous loop seat belt system 12 for use in helping to restrain an occupant of a vehicle or a child seat against movement relative to the vehicle. The following description assumes that the seat belt system 12 is used in restraining a vehicle occupant. It should be understood that the invention could be applied to other belt systems.

During operation of the vehicle, the occupant of the vehicle sits on a seat 14 which is illustrated as a front passenger seat in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to a seat belt retractor 22 which is secured to the vehicle body on the same side of the seat 14. Intermediate its ends, the belt webbing 16 passes through the tongue assembly 10 and a D-ring 24 that is located above the retractor 22 and the anchor point 20. When the seat belt system 12 is not in use, or is in its stowed condition, the belt webbing 16 is wound on the retractor 22 and is oriented generally vertically on the one side of the seat 14, as shown in solid lines in FIG. 1.

To engage the seat belt system 12, the tongue assembly 10 is manually grasped and is pulled across the lap and torso of the occupant sitting in the seat 14. As the tongue assembly 10 is pulled across the lap and torso of the occupant, the tongue assembly moves along the belt webbing 16, and the belt webbing is unwound from the retractor 22. When the belt webbing 16 has been pulled across the lap and torso of the occupant, the tongue assembly 10 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 10 into a torso portion 28 which extends across the torso of the occupant and a lap portion 30 which extends across the lap of the occupant.

The tongue assembly 10 (FIGS. 2–4) includes a metal plate member 34 which is preferably made of heat treated and chrome plated steel. The plate member 34 is a single piece of stamped metal and includes a generally planar leading end portion 36. The leading end portion 36 of the plate member 34 extends along a first plane 38 (FIG. 3). An opening 42 (FIG. 2) in the leading end portion 36 of the plate member 34 forms a buckle latch receiving opening in the tongue assembly 10. The opening 42 may be of any design. An optional opening 40 may be formed in the plate members to reduce the weight of the tongue assembly 10.

The plate member 34 includes a generally planar trailing end portion 46 which extends along a second plane 48 (FIG. 3). The second plane 48 is roughly parallel to, and offset from, the first plane 38. As a result, the trailing end portion 46 of the plate member 34 is roughly parallel to, and offset from, the leading end portion 36 of the plate member.

A connector portion 50 (FIG. 2) of the plate member 34 extends at an angle between, and interconnects, the leading end portion 36 and trailing end portion 46 of the plate member. The connector portion 50 includes parallel, spaced apart first and second arm portions 54 and 56. The arm portions 54 and 56 lie in a connector plane which extends at an angle between the first plane 38 and the second plane 48.

The leading end portion 36, the trailing end portion 46, the first arm portion 54, and the second arm portion 56 of the plate member 34 define a first belt webbing opening 60 in the tongue assembly 10. The first belt webbing opening 60 is disposed between the leading end portion 36 and the trailing end portion 46 of the plate member 34. The first belt webbing opening 60 has a width measured between the leading end portion 36 and the trailing end portion 46 of the plate member 34 which is sufficient to enable the belt webbing 16 (FIG. 3) to pass freely through the first belt webbing opening.

Figures 5, 6, 7, 8:
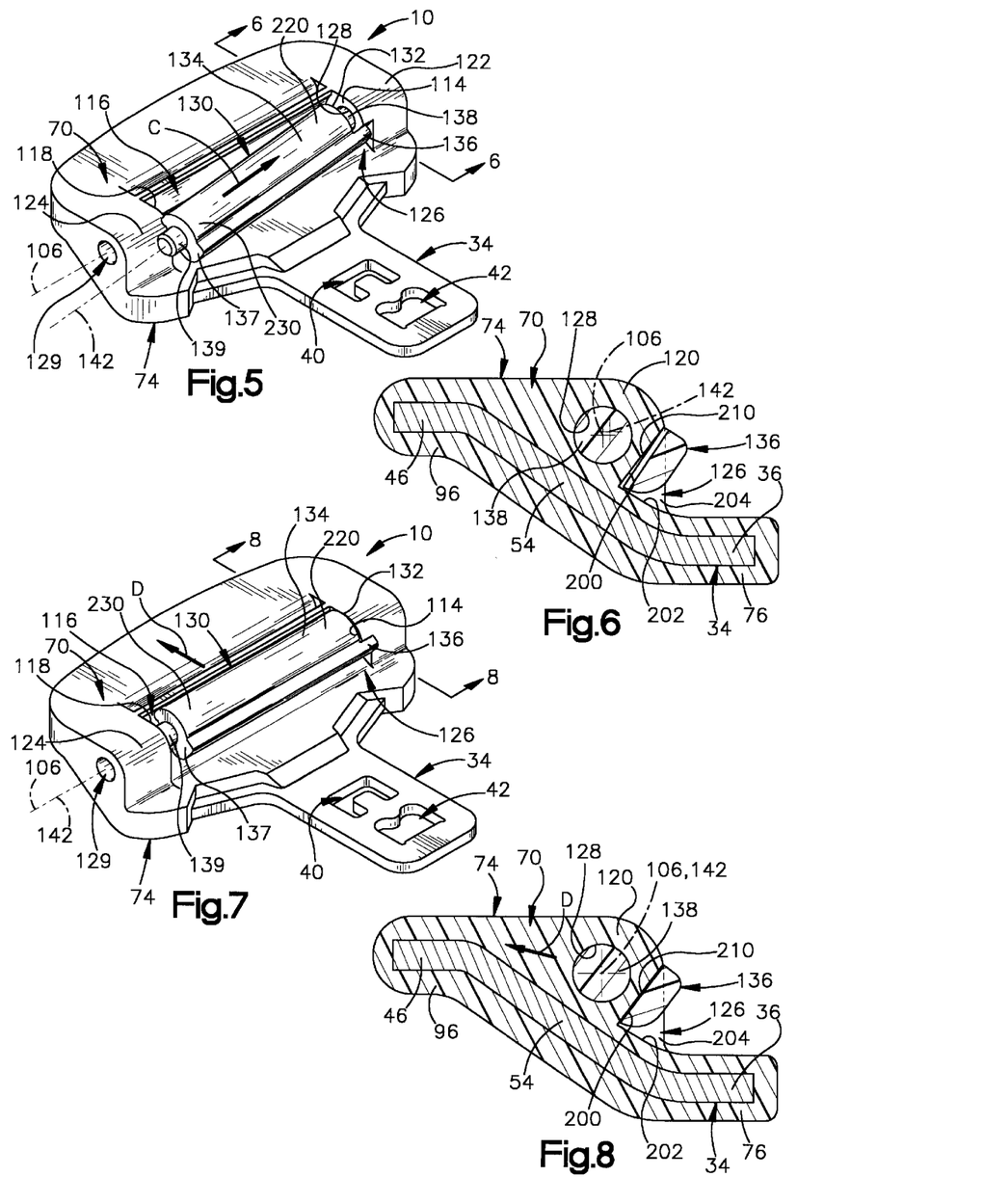
FIG. 5 is a view similar to FIG. 2 showing parts of the tongue assembly in a first assembling position.
FIG. 6 is a sectional view of the tongue assembly of FIG. 5 taken along line 6—6.
FIG. 7 is a view similar to FIG. 5 showing parts of the tongue assembly in a second assembling position.
FIG. 8 is a sectional view of the tongue assembly of FIG. 7 taken along line 8—8.

The tongue assembly 10 also includes a body 70 of plastic material which covers most of the plate member 34 and which has portions which are located in the first belt webbing opening 60. The body 70 of plastic material is molded from nylon, preferably Zytel® (trademark of E.I. Dupont de Nemours & Co.) brand plastic. The body 70 of plastic material is insert molded as one piece on the metal plate member 34 by a known process. Together the plate member 34 and the body 70 of plastic material form a latch plate sub-assembly 74 (FIG. 6).

The body 70 of plastic material includes a leading end portion 76 which covers a part of the leading end portion 36 of the plate member 34. The leading end portion 76 of the body 70 of plastic material has first and second major side surfaces 78 and 80 (FIG. 3) spaced apart generally an equal distance on opposite sides of the first plane 38.

The leading end portion 76 of the body 70 of plastic material has a first webbing guiding surface 84. The first webbing guiding surface 84 is planar and extends in a plane which is skewed at an angle of about 60 with respect to the first plane 38. A first arcuate connector surface 86 extends between and interconnects the first webbing guiding surface 84 and the first major side surface 78 of the leading end portion 76 of the body 70 of plastic material.

The leading end portion 76 of the body 70 of plastic material also has a planar clamping surface 90. The clamping surface 90 extends along the first webbing guiding surface 84 at an angle of about 55° with respect to the first plane 38. A second arcuate connector surface 86a extends between and interconnects the clamping surface 90 and the second major side surfaces 80 of the leading end portion 76 of the body 70 of plastic materials. The clamping surface 90 and the second arcuate connector surface 86a interconnect the first webbing guiding surface 84 with the second major side surface 80 of the leading end portion 76 of the body 70 of plastic material.

The body 70 of plastic material also includes a trailing end portion 96 which covers the trailing end portion 46 of the plate member 34. The trailing end portion 96 of the body 70 of plastic material has first and second major side surfaces 98 and 100 spaced apart on opposite sides of the second plane 48. An arcuate, concave support surface 104 extends from the second major side surface 100 of the trailing end portion 96 in a direction toward the first major side surface 98 of the trailing end portion 96. The support surface 104 has a center of curvature located on a longitudinally extending first central axis 106 of the tongue assembly 10.

A planar second webbing guiding surface 110 extends from the first major side surface 98 of the trailing end portion 96 in a direction toward the second major side surface 100 of the trailing end portion 96. The second webbing guiding surface 110 lies in a plane which is skewed with respect to the second plane 48 and also with respect to the first webbing guiding surface 84.

A planar connecting surface 112 extends transversely between, and interconnects, the second webbing guiding surface 110 and the support surface 104. The connecting surface 112 is generally parallel to, and spaced apart from, the planar clamping surface 90 of the leading end portion 76 of the body 70 of plastic material.

Figure 2:
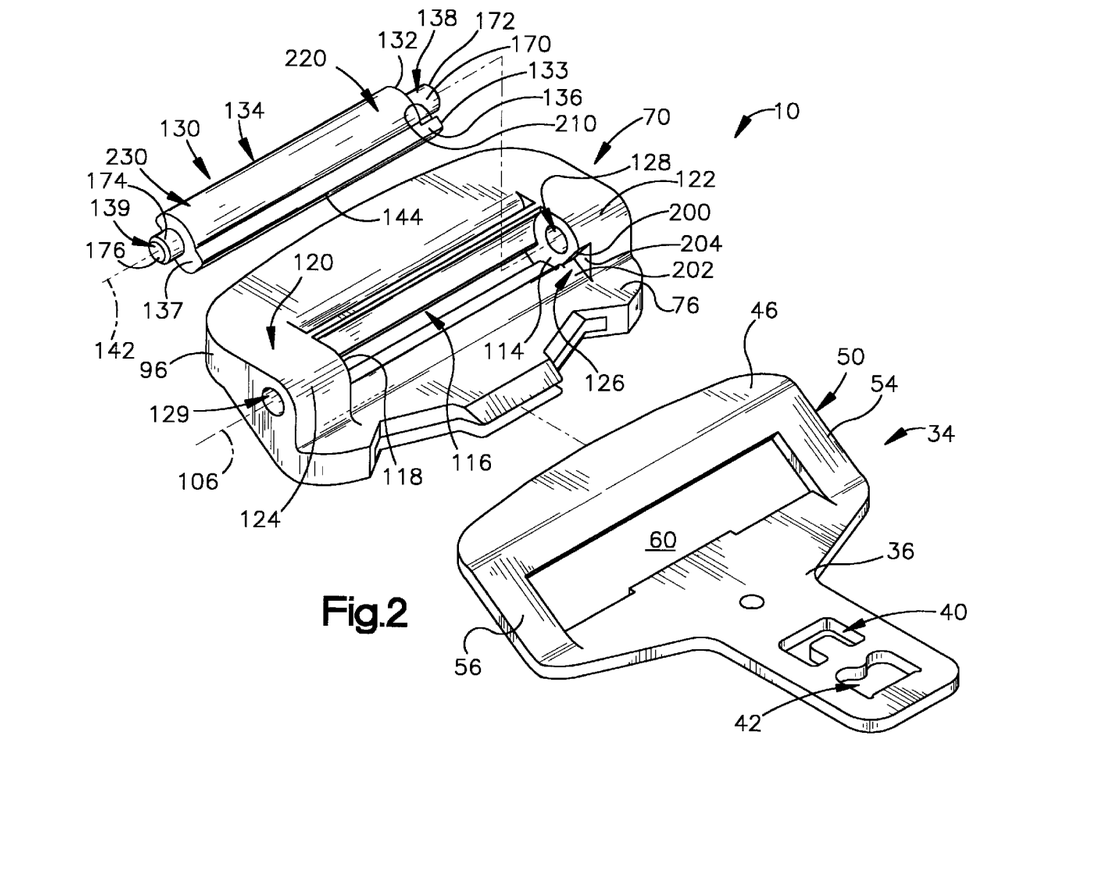
FIG. 2 is an exploded perspective view of the tongue assembly of FIG. 1.
Figure 3:
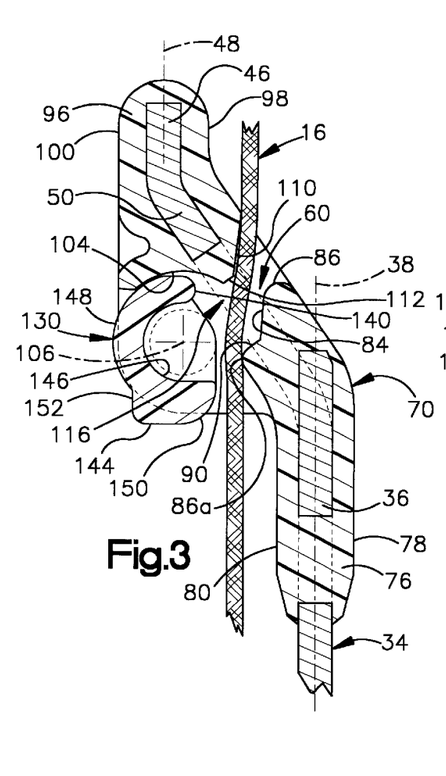
FIG. 3 is a side sectional view of the tongue assembly of FIG. 2 in an assembled condition.

The body 70 of plastic material also includes a connector portion 120 (FIG. 2). The connector portion 120 includes spaced apart first and second arm portions 122 and 124 (FIG. 2) which cover the first and second arm portions 54 and 56 of the plate member 34.

The first arm portion 122 of the body 70 of plastic material is partially defined by a planar first side wall 114 (FIG. 5). The first arm portion 122 includes a first cylindrical opening 128. The first cylindrical opening 128 extends axially from the first side wall 114, away from the second arm portion 124, to the exterior of the body 70 of plastic material. The first cylindrical opening 128 is centered on the first axis 106.

The first arm portion 122 includes a notch 126 adjacent to the first cylindrical opening 128 and presented toward the second arm portion 124. The notch 126 is defined in part by a planar first surface 200, a planar second surface 202, and a planar third surface 204. The first surface 200 extends axially from the first side wall 114, away from the second arm portion 124, to the third surface 204. The second surface 202 extends transverse to the first surface 200 and axially to the third surface 204. The third surface 204 is parallel to, and spaced apart from, the first side wall 114.

The second arm portion 124 of the body 70 of plastic material is partially defined by a planar second side wall 118.

The second side wall 118 is parallel to, and spaced apart from, the first side wall 114 by a first distance. The second side wall 118 includes a second cylindrical opening 129 spaced apart from the first cylindrical opening 128. The second cylindrical opening 129 extends axially from the second side wall 118 away from the first side wall 114 and is centered on the first axis 106.

The clamping surface 90 (FIG. 3), the first webbing guiding surface 84, and the connector surfaces 86 and 86a of the leading end portion 76, the support surface 104, the second webbing guiding surface 110, and the connecting surface 112 of the trailing end portion 76, and the first side wall 114 and the second side wall 118 of the connector portion 120 together define a second belt webbing opening 116 in the body 70 of plastic material. The second belt webbing opening 116 is disposed between the leading end portion 76 and the trailing end portion 96 of the body 70 of plastic material. The second belt webbing opening 116 has a width measured between the leading end portion 76 and the trailing end portion 96 of the body 70 of plastic material which is smaller than the width of the first belt webbing opening 60 but is sufficient to enable the belt webbing 16 to pass freely through the opening 116. The length of the second belt webbing opening 116 is equal to the first distance in the latch plate sub-assembly 74 that is, the distance between the first side wall 114 and the second side wall 118 of the connector portion 120.

The tongue assembly 10 includes a cinch bar 130 (FIG. 2). The cinch bar 130 includes a body portion 134 extending axially between a first end 220 and a second end 230. The first end 220 of the cinch bar 130 includes a planar first end wall 132 and a planar second end wall 133, which is parallel to and spaced apart a second distance from the first end wall. The second end 230 of the cinch bar 130 includes a planar third end wall 137, which is parallel to and spaced apart from the first end wall 132 by a third distance and from the second wall 133 by a fourth distance, respectively. The fourth distance is slightly less than the first distance in the latch plate sub-assembly 74.

The body portion 134 of the cinch bar 130 includes a projection key or key portion 136 that extends axially from the first end wall 132 of the cinch bar 130. The key portion 136 has a shape complementary to the notch 126. The key portion 136 is defined in part by a planar fourth surface 210 extending axially between the first end wall 132 and the second end wall 133. The key portion 136, thus, has an axial length equal to the second distance, which is slightly less than the axial length of the notch 126. It is contemplated that the key portion 136, and thus, the notch 126, could have shapes differing from that which is described herein.

The body portion 134 of the cinch bar 130 includes an arcuate belt webbing clamping surface 140 (FIG. 3) and a cinch bar actuation surface 144. An arcuate inner side surface 146 and an arcuate outer side surface 148, having centers of curvature on the first axis 106, extend between and interconnect the belt webbing clamping surface 140 and the cinch bar actuation surface 144. A plurality of radially extending ribs (not shown) are spaced apart at intervals over the length of the cinch bar body portion 134. Each rib has the cross-sectional configuration of the body portion 134 as a whole. The cinch bar 130 is molded in this manner in accordance with known molding practices.

The belt webbing clamping surface 140, the inner side surface 146, and the outer side surface 148 all extend axially between the first end wall 132 and the third end wall 137 and, thus, have axial lengths equal to the third distance. The cinch bar actuation surface 144 has an axial length slightly less than the fourth distance and has a portion extending between and connecting opposite ends of the fourth surface 210, thus helping to define the key portion 136.

The cinch bar actuation surface 144 includes a curved belt webbing engaging surface 150 extending from the inner side surface 146 towards the outer side surface 148. The cinch bar actuation surface 144 also includes a planar stop surface 152 which extends between and interconnects the belt webbing engaging surface 150 and the arcuate outer side surface 148 of the cinch bar 130. The radial distance between the major portion of the stop surface 152 and the first axis 106 is greater than the radial distance between the arcuate outer side surface 148 and the first axis.

The cinch bar 130 includes a first pivot pin 138 (FIG. 2) and a second pivot pin 139. The first pivot pin 138 is defined by a first cylindrical surface 170 extending axially between the first end wall 132 and a first circular wall 172. The first circular wall 172 is parallel to, and spaced apart a fifth distance, greater than the second distance, from the first end wall 132. The first pivot pin 138 is adjacent to the key portion 136 and is centered on a longitudinally extending second central axis 142.

The second pivot pin 139 is defined by a second cylindrical surface 174 extending axially between the third end wall 137 and a second circular wall 176. The second circular wall 176 is spaced apart a sixth distance, less than the fifth distance, from the third end wall 137. The second pivot pin 139 is centered on the second axis 142.

The first and second pivot pins 138 and 139 are disposed in the first and second cylindrical openings 128 and 129, respectively, in the latch plate sub-assembly 74. The first and second pivot pins 138 and 139 support the cinch bar 130 for pivotal movement about the first axis 106. The axial length of the cinch bar 130, or the distance between the first circular wall 172 and the second circular wall 176 is equal to a seventh distance, greater than the first distance.

The cinch bar 130 is preferably molded from Acetal® (trademark of Celenese Plastics Corp.) brand plastic. The cinch bar 130 is preferably molded as one piece of plastic but may, alternatively, be formed as two pieces (not shown) with the body portion 134 having a central longitudinal opening for receiving a separate pivot pin which may be made of another material.

FIG. 3 illustrates the parts of the tongue assembly 10 in an unlocked condition. The belt webbing 16 of the seat belt system 12 (FIG. 1) is in its stowed condition and the tongue assembly 10 is adjacent the D-ring 24. The belt webbing 16 extends through the tongue assembly 10 in a relatively straight condition. The cinch bar 130 is in a disengaged position on the tongue assembly 10 in which the belt webbing 16 is located between the cinch bar 130 and the leading end portions 36 and 76 of the plate member 34 and the body 70 of plastic material, respectively as shown in FIG. 3. When the cinch bar 130 is in the disengaged position, the belt webbing clamping surface 140 of the cinch bar is spaced apart from the clamping surface 90 of the body 70 of plastic material by an eighth distance.

To engage the seat belt system 12 (FIG. 1), the vehicle occupant grasps the leading end portion 36 of the plate member 34 of the tongue assembly 10 with the buckle 26. The vehicle occupant then pulls on the tongue assembly 10 until enough of the belt webbing 16 passes through the tongue assembly 10 to make the lap portion 30 fit tightly around the occupant's lap. The vehicle occupant then inserts the tongue assembly 10 into the buckle 26 so that the seat belt system 12 is in the buckled condition as shown in dashed lines in FIG. 1.

As the seat belt system 12 is moved into the buckled condition, the belt webbing 16 partially wraps around, or encircles, the cinch bar 130 and assumes a U-shape within the tongue assembly 10. Both the lap portion 30 and the torso portion 28 of the belt webbing 16 extend from the cinch bar 130 of the tongue assembly 10 in an upward direction as viewed in FIG. 4. The lap portion 30 of the belt webbing 16 is tight around the occupant's lap and is under tension from the anchor point 20. This tensile force acts on the lap portion 30 of the belt webbing 16 in an upward direction indicated by the arrow A in FIG. 4. The torso portion 28 of the belt webbing 16 is also under tension from a retraction force applied by the retractor 22.

As the belt webbing 16 wraps around the cinch bar 130, a first portion 160 (FIG. 4) of the belt webbing frictionally engages the belt webbing engaging surface 150 of the cinch bar 130. The first portion 160 of the belt webbing 16 transfers force from the belt webbing to the cinch bar 130. This eccentric force causes the cinch bar 130 to pivot in a direction indicated by the arrow B, that is, clockwise as viewed in FIGS. 3 and 4. The support surface 104 of the body 70 of plastic material helps to guide the pivotal movement of the cinch bar 130 and supports the cinch bar under high loads.

Figure 4:
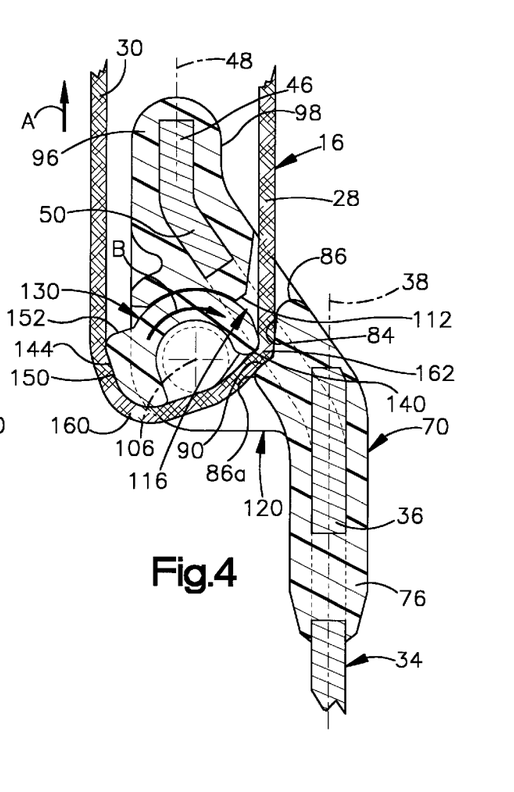
FIG. 4 is a view similar to FIG. 3 showing parts of the tongue assembly in a different position.

As the cinch bar 130 pivots in the direction B, the belt webbing clamping surface 140 frictionally engages a second portion 162 of the belt webbing 16. Together with the second portion 162 of the belt webbing, the belt webbing clamping surface 140 moves toward the leading end portion 76 of the tongue assembly 10 along an arcuate path having a center of curvature on the first axis 106. The cinch bar 130 pivots in the direction B until the clamping force exerted on the belt webbing 162 by the clamping surfaces 90 and 140 balances the pivoting force applied to the belt webbing engaging surface 150.

The cinch bar 130 is then in an engaged position as shown in FIG. 4. When the cinch bar 130 is in the engaged position, the belt webbing clamping surface 140 of the cinch bar is spaced from the clamping surface 90 of the body 70 of plastic material by a ninth distance, which is less than the eighth distance. The belt webbing clamping surface 140 of the cinch bar 130 clamps the second portion 162 of the belt webbing 16 against the clamping surface 90 of the body 70 of plastic material on the tongue assembly 10.

The clamping of the belt webbing 16 against the clamping surface 90 of the body 70 of plastic material blocks movement of the belt webbing 16 through the tongue assembly 10 in the direction A. Thus, the belt webbing 16 is clamped by the cinch bar 130 in the tongue assembly 10, and the lap portion 30 of the belt webbing cannot normally be lengthened.

The force applied to the lap portion 30 of the belt webbing 16 may be increased substantially if the vehicle decelerates suddenly and the vehicle occupant's momentum causes the occupant to move forward relative to the seat 14. The parts of the tongue assembly 10 can be configured so that, if this occurs, the belt webbing 16 may slip through the tongue assembly to balance the load on the torso portion 28 and the lap portion 30 of the seat belt system 12. This may happen if the force on the belt webbing 16 exceeds a predetermined level, for example, about 120 pounds.

When the vehicle occupant unbuckles the seat belt system 12, the tension on the lap portion 30 of the belt webbing 16 is released. The retractor 22 pulls on the belt webbing 16 and winds belt webbing on the retractor to return the seat belt system 12 to the stowed condition as shown in FIG. 1. The retractor 22 also pulls the belt webbing 16 through the tongue assembly 10. In response to movement of the webbing 16, the tongue assembly 10 returns to its unlocked condition and the cinch bar 130 pivots back to the disengaged position shown in FIG. 3.

The foregoing description assumes that the seat belt system 12 (FIG. 1) is used for restraining a vehicle occupant in the seat 14. As noted above, the seat belt system 12 (FIG. 1) can also be used for restraining a child seat (not shown) in the seat 14. The seat belt system 12, when used for restraining a child seat in the seat 14, is buckled so that the lap portion 30 of the belt webbing 16 holds the child seat on the vehicle seat 14. The tongue assembly 10 clamps the seat belt webbing 16 so that the lap portion 30 of the belt webbing cannot be lengthened. Thus, the child seat is securely held in position on the vehicle seat 14 and does not move relative to the vehicle seat during vehicle maneuvering.

To assemble the tongue assembly 10 (FIGS. 5–12), the first end 220 of the cinch bar 130 is moved in a first assembly direction, as indicated by the arrow C, towards the first side wall 114 and into the second belt webbing opening 116, as shown by FIG. 5. A first amount of force is used to move the cinch bar 130 in the direction C to slide the first pivot pin 138 of the cinch bar 130 into the first cylindrical opening 128 and simultaneously to slide the key portion 136 into the notch 126.

Since the axial length of the cinch bar 130 is greater than the axial length of the second belt webbing opening 116, the cinch bar 130 must be angled with respect to the first axis 106 as it is moved in the direction C. This angled orientation may cause portions of the cinch bar 130 to frictionally engage portions of the latch plate sub-assembly 74 to varying degrees. Examples may include; as the cinch bar 130 is moved in the direction C, (i) the first pivot pin 138 may frictionally engage the surface defining the first cylindrical opening 128, (ii) the fourth surface 210 (FIG. 6) of the cinch bar may frictionally engage the first surface 200 of the notch 126, and (iii) the second pivot pin 139 (FIG. 5) may frictionally engage the second arm portion 124 of the connector portion 120. Frictional forces between the cinch bar 130 and the latch plate sub-assembly 74 may inhibit movement of the cinch bar in the direction C such that the movement of the cinch bar in the direction C ceases upon the application of the first amount of force, leaving the cinch bar in a first assembling position as shown in FIGS. 5 and 6.

In the first assembling position, most of the first end 220 of the cinch bar 130 is disposed in the second belt webbing opening 116 so that a first portion of the first pivot pin 138 is inserted within the first cylindrical opening 128 and a first portion of the key portion 136 is inserted within the notch 126.

With respect to the key portion 136, as the cinch bar 130 is being moved in the direction C to the first assembling position, the cinch bar 130 must be oriented such that the fourth surface 210 (FIG. 6) of the key portion 136 of the cinch bar is facing, and engages, the first surface 200 of the notch 126. In other words, when the cinch bar 130 is being moved in the direction C, the cinch bar must be oriented such that the first pivot pin 138 is presented towards the first side wall 114. As explained below in detail, this orientation is necessary for proper assembly of the tongue assembly 10.

When in the first assembling position, the second end 230 of the cinch bar 130 is outside of, or spaced apart from, the second belt webbing opening 116 such that the second pivot pin 139 lies on top of the second arm portion 124 of the connector portion 120 of the body 70 of plastic material. Thus, in the first assembling position, the cinch bar 130 is angled with respect to the second belt webbing opening 116 such that the second axis 142 of the cinch bar 130 is skewed with respect to the first axis 106, as shown in FIG. 5.

A second amount of force, greater than the first amount of force, may then be exerted in the direction C on the second end 230, or the third end wall 137, of the cinch bar 130. The second amount of force is sufficient to overcome any frictional forces between the cinch bar 130 and the latch plate sub-assembly 74 and moves the cinch bar further in the direction C towards the first side wall 114. Continued movement of the cinch bar 130 in the direction C disengages the second pivot pin 139 from the second arm portion 124 and allows the second end 230 of the cinch bar to be moved in a second assembling direction, transverse to the direction C, as indicated by the arrow D, into the second belt webbing opening 116 to a second assembling position as shown in FIGS. 7 and 8. Because the first pivot pin 138 is longer than the second pivot pin 139, the cinch bar 130 cannot be assembled into the latch plate sub-assembly 74 if the cinch bar is reversed end for end.

In the second assembling position, the first end 220 of the cinch bar 130 is disposed in the second belt webbing opening 116 so that a second portion of the first pivot pin 138 is disposed within the first cylindrical opening 128 and a second portion of the key portion 136 is partially disposed within the notch 126. The second portions of the first pivot pin 138 and the key portion 136 are greater than the first portions of the first pivot pin and the key portion, respectively. Preferably, the second portion of the first pivot pin 138 is substantially all of the first pivot pin and the second portion of the key portion 136 is substantially all of the key portion.

Also, when the cinch bar 130 is in the second assembling position, the second axis 142 of the cinch bar 130 is coincident with the first axis 106 as shown in FIGS. 7 and 8. When the cinch bar 130 is in the second assembling position, the second pivot pin 139 is aligned with, but spaced axially outside of, the second cylindrical opening 129.

Figures 9, 10, 11, 12:
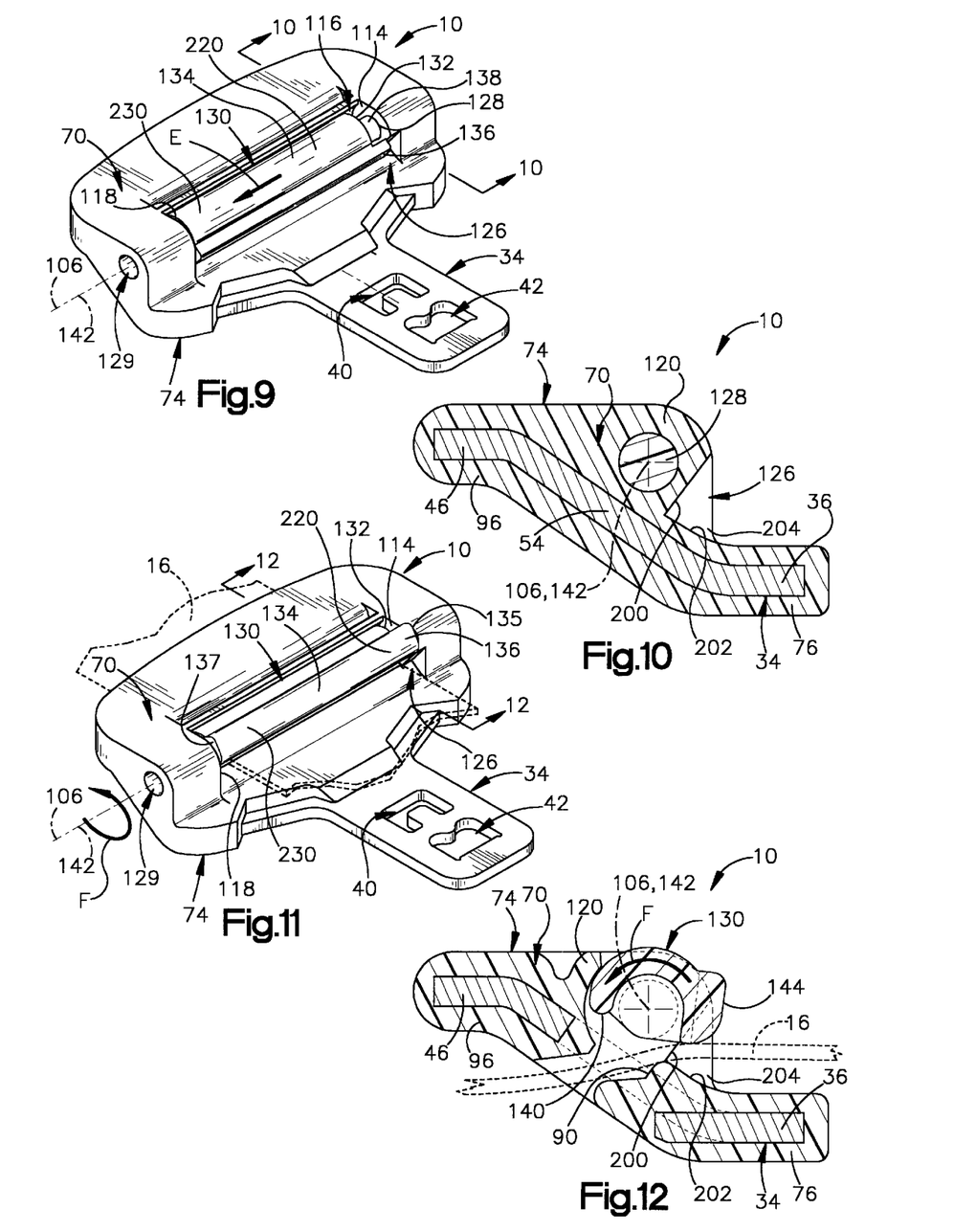
FIG. 9 is a view similar to FIG. 7 showing parts of the tongue assembly in a third assembling position.
FIG. 10 is a sectional view of the tongue assembly of FIG. 9 taken along line 10—10.
FIG. 11 is a view similar to FIG. 9 showing parts of the tongue assembly in a fourth assembling position.
FIG. 12 is a sectional view of the tongue assembly of FIG. 11 taken along line 12—12.

A third amount of force, substantially smaller than the first or second amounts of force, is then exerted on the cinch bar 130 to move, or slide, the cinch bar towards the third side wall 118 in a third assembling direction, indicated by the arrow E to a third assembling position as shown by FIGS. 9 and 10. The third assembling direction E is generally opposite the first assembling position C. As the cinch bar 130 is moved to the third assembling position, the second pivot pin 139 slides into the second cylindrical opening 129.

In the third assembling position, the entire body portion 134 of the cinch bar 130 is disposed in the second belt webbing opening 116. A third portion of the first pivot pin 138, less than the second portion, is disposed within the first cylindrical opening 128. A portion of the second pivot pin 139 is disposed within the second cylindrical opening 129. The key portion 136 is located in the second belt webbing opening 116 and is spaced apart axially from the notch 126, as best seen in FIG. 9. With the key portion 136 being spaced apart axially from the notch 126, the fourth surface 210 (FIG. 10) of the cinch bar 130 is disengaged, or spaced apart axially, from the first surface 200 of the notch 126, thereby allowing pivotal movement of the cinch bar on the first axis 106.

It is important to note that as the cinch bar 130 is being moved in the direction E to the third assembling position, a portion of the first pivot pin 138 remains disposed within the first cylindrical opening 128 at all times. Thus, the second pivot pin 139 is inserted within the second cylindrical opening 129 while a portion of the first pivot pin 138 remains disposed within the first cylindrical opening 128.

The cinch bar 130 is then pivoted, or rotated, in a counterclockwise direction as indicated by the arrow F to a fourth assembling position as shown in FIGS. 11 and 12. In the fourth assembling position, both the first and second pivot pins 138 and 139 have portions which remain disposed axially within the first and second cylindrical openings 128 and 129, respectively, in a manner which is essentially identical to that in the third assembling position. In the fourth assembling position, the key portion 136 causes the first end wall 132 of the cinch bar 130 to be spaced at least about the second distance from the first side wall 114 of the body 70 of plastic material as in the third assembling position. In the fourth assembling position, the key portion 136 is thus also spaced angularly about the first axis 106 from the notch 126. This angular and axial separation of the key portion 136 from the notch 126 prevents the cinch bar 130 from moving back into the second assembling position.

While the cinch bar 130 is in the fourth assembling position, a clearance exists in the second belt webbing opening 116 between the body portion 134 of the cinch bar and the leading end portion 76 of the body 70 of plastic material. The clearance is wider than the thickness of the belt webbing 16. This enables the belt webbing 16 to be inserted through the second belt webbing opening 116 to enable use of the tongue assembly 10 with the seat belt system 12.

When the belt webbing 16 is disposed within the second belt webbing opening 116 as shown in FIGS. 11 and 12, the thickness of the belt webbing prevents the cinch bar 130 from pivoting back to the third assembling position. Thus, the key portion 136 cannot be shifted back into the notch 126. The first and second pivot pins 138 and 139 remain disposed within the first and second cylindrical openings 128 and 129, respectively, and the cinch bar 130 cannot be removed from the latch plate sub-assembly 74. The tongue assembly 10, as assembled, is then ready for use with the seat belt system 12.

The axial lengths of the first pivot pin 138, the second pivot pin 139, the body portion 134 of the cinch bar 130, and the second belt webbing opening 116 are such that the axial length of the clearance that exists between the second end wall 133 of the cinch bar and the first side wall 114 of the body 70 of plastic material, when the third end wall 137 abuts the second side wall 118, is less than the axial length of the portion of the first pivot pin 138 which is disposed within the first cylindrical opening 128. The axial length of the clearance that exists between the third end wall 137 of the cinch bar 130 and the second side wall 118 of the body 70 of plastic material, when the second end wall 133 abuts the first side wall 114, is less than the axial length of the portion of the second pivot pin 139 which is disposed within the second cylindrical opening 129. The clearances being less than the portions of the first and second pivot pins 138 and 139 disposed within the first and second cylindrical openings 128 and 129, respectively, ensures that the cinch bar 130 remains supported on the latch plate sub-assembly 74, and does not fall out of the second seat belt webbing opening 116, when the cinch bar is in the fourth assembling position.

From the above description of the invention, those skilled in the art will perceive improvements, changes and modifications in the invention. For example, the configuration of the body of plastic material may be altered from the free-falling configuration to a free-running configuration. Such improvements, changes and modifications within the skill of the art are intended to be covered by the appended claims.

Having described the invention, we claim:

1. A method of assembling a tongue which is movable along seat belt webbing and includes a latch plate sub-assembly for engaging a buckle and a cinch bar carried by the latch plate sub-assembly for pivotal movement relative to the latch plate sub-assembly between a first position enabling the seat belt webbing and the latch plate sub-assembly to move relative to one another and a second position clamping the seat belt webbing against the latch plate sub-assembly, wherein the first end of the cinch bar includes an axially extending first pivot pin and the second end of the cinch bar includes an axially extending second pivot pin, the first pivot pin having an axial length equal to a first distance, and the second pivot pin having an axial length to a second distance, less than the first distance; and wherein the first end of the cinch bar includes an axially extending key portion adjacent to the first pivot pin and having an axial length equal to a third distance, less than the first distance, the key portion being inserted into a notch portion in the latch plate sub-assembly while inserting the first end of the cinch bar into the first opening, the cinch bar being incapable of pivotal movement while the key portion is inserted in the notch portion, the method comprising the steps of:

inserting a first end of the cinch bar into a first opening in the latch plate sub-assembly by movement of the cinch bar in a first direction;

inserting a second end of the cinch bar into a second opening spaced away from the first opening in the latch plate sub-assembly by movement of the cinch bar in a second direction generally opposite the first direction; and maintaining the first end of the cinch bar in the first opening while inserting the second end of the cinch bar in the second opening.

2. A method of assembling a tongue which is movable along seat belt webbing and includes a latch plate sub-assembly for engaging a buckle and a cinch bar carried by the latch plate sub-assembly for pivotal movement relative to the latch plate sub-assembly between a first position enabling the seat belt webbing and the latch plate sub-assembly to move relative to one another and a second position clamping the seat belt webbing against the latch plate sub-assembly, the method comprising the steps of:

inserting a first end of the cinch bar into a first opening in the latch plate sub-assembly by movement of the cinch bar in a first direction;

inserting a second end of the cinch bar into a second opening spaced away from the first opening in the latch plate sub-assembly by movement of the cinch bar in a second direction generally opposite the first direction;

maintaining the first end of the cinch bar in the first opening while inserting the second end of the cinch bar in the second opening; and pivoting the cinch bar counterclockwise in a fourth direction after inserting the second end of the cinch bar in the second opening.

3. A method as defined in claim 2, further comprising inserting the seat belt webbing between the cinch bar and a first portion of the latch plate subassembly after the step of pivoting the cinch bar in the fourth direction.

4. A method as defined in claim 3, wherein the cinch bar cinches the seat belt webbing against the first portion of the latch plate sub-assembly when the cinch bar is in the second position; and the cinch bar pivots in a first direction, opposite to the fourth direction, when moving from the first position to the second position.

5. A method of assembling a tongue assembly for a seat belt system comprising the following steps in the sequence set forth:

providing a latch plate sub-assembly, the latch plate sub-assembly having a webbing opening partially defined by a first side wall and a second side wall facing the first side wall, the first side wall having a first cylindrical opening centered on a first longitudinal axis and the second side wall having a second cylindrical opening centered on the first longitudinal axis, the first side wall having a notch portion extending axially away from the second wall portion;

providing a cinch bar including a body portion with a first end portion having a first end wall and a second end portion having a second end wall, the body portion extending axially between the first end wall and the second end wall along a second longitudinal axis, the first end wall having a first cylindrical extension pin extending axially away from the second end wall along the second axis, the second end wall having a second cylindrical extension pin extending axially away from the first end wall along the second axis, the first end wall having a projection key portion extending axially away from the second end wall;

moving the cinch bar to a first position wherein the first end portion is located in the webbing opening and the second end portion is spaced apart from the webbing opening;

moving the cinch bar to a second position wherein a portion of the first cylindrical extension pin is in the first cylindrical opening and a portion of the projection key portion is in the notch portion with the second end portion of the cinch bar being spaced apart from the webbing opening;

moving the cinch bar to a third position wherein the first and second end portions of the cinch bar are in the webbing opening such that the second axis is coincident with the first axis, while the cinch bar is in the third position, a portion of the first cylindrical extension pin is in the first cylindrical opening and a portion of the projection key portion is in the notch portion with the second cylindrical extension pin being spaced apart from the second cylindrical opening;

moving the cinch bar to a fourth position wherein a portion of the first cylindrical extension pin is in the first cylindrical opening and a portion of the second cylindrical extension pin is in the second cylindrical opening with the projection key portion being spaced apart from the notch portion; and rotating the cinch bar away from the notch portion to a fifth position.

6. A method of assembling a tongue assembly for a seat belt system, the method comprising the steps of:

providing a latch plate sub-assembly having spaced apart first and second side walls partially defining a webbing opening, the first side wall having a notch extending axially away from the second side wall;

providing a cinch bar having first and second end portions and a key portion at the first end portion extending axially away from the second end portion;

moving the cinch bar into a first position relative to the latch plate sub-assembly in which the first end portion of the cinch bar is in the webbing opening and the key portion is in the notch;

moving the cinch bar from the first position to a second position relative to the latch plate sub-assembly in which the second end portion of the cinch bar is in the webbing opening and the cinch bar is supported for rotation on the latch plate sub-assembly and the key portion is spaced axially from the notch;

rotating the cinch bar from the second position relative to the latch plate sub-assembly to a third position relative to the latch plate sub-assembly in which the key portion is spaced axially and angularly from the notch; and inserting a length of seat belt webbing between the cinch bar and the latch plate sub-assembly, the seat belt webbing when disposed between the cinch bar and the latch plate sub-assembly preventing the cinch bar from rotating from the third position to the second position to prevent the cinch bar from moving out of the webbing opening.

7. A method as defined in claim 6 wherein the key portion comprises a first planar surface and a curved surface, the curved surface extends between and connects opposite ends of the first planar surface.

8. A method as defined in claim 7 wherein the notch comprises a second planar surface, the second planar surface facing and engaging the first planar surface when the cinch bar is in the first position.

9. A method as defined in claim 6 wherein the first side wall includes a first cylindrical opening and the second side wall includes a second cylindrical opening, the first end of the cinch bar including a first cylindrical pin and the second end of the cinch bar including a second cylindrical pin, the first and second pins being disposed within the first and second cylindrical openings, respectively, when the cinch bar is in the second and third positions, the webbing when disposed between the cinch bar and the latch plate sub-assembly preventing either of the pins from moving out of their respective cylindrical openings.

10. An apparatus comprising:
   a tongue assembly latchable in a buckle and including a latch plate sub-assembly;
   seat belt webbing extensible through said tongue assembly; and
   a cinch bar mounted on said latch plate subassembly and pivotable between a first position in which said webbing and tongue assembly can move relatively and a second position in which said cinch bar and latch plate sub-assembly clamp said webbing to block said relative movement;
   said latch plate sub-assembly and cinch bar having cooperating notch and key features, said key having a first position receivable in said notch to permit assembly of said cinch bar on said latch plate sub-assembly and a second position out of said notch;
   said webbing blocking said cinch bar from moving into the first position in which said key is in the notch.

11. An apparatus as defined in claim 10 wherein said cinch bar has a first end and a second end, said key being located on said first end and extending axially away from said second end.

12. An apparatus as defined in claim 11 wherein said key comprises a first planar surface and a curved surface, said curved surface extending between and connecting opposite ends of said first planar surface.

13. An apparatus for use with a seat belt webbing comprising:
   a tongue assembly latchable in a buckle and including a latch plate sub-assembly, the seat belt webbing being extensible through said tongue assembly; and
   a cinch bar mounted on said latch plate sub-assembly and pivotable between a first position in which the webbing and said tongue assembly can move relatively and a second position in which said cinch bar and said latch plate sub-assembly clamp the webbing to block said relative movement;
   said latch plate sub-assembly and cinch bar having cooperating notch and key features, said key having a first position receivable in said notch to permit assembly of said cinch bar on said latch plate sub-assembly and a second position out of said notch;
   the webbing blocking said cinch bar from moving into the first position in which said key is in the notch.

14. An apparatus as defined in claim 13 wherein said cinch bar has a first end and a second end with said key being located on said first end and extending axially away from said second end.

15. An apparatus comprising:
   a latch plate sub-assembly having axially spaced first and second side walls, the first side wall having a notch extending axially away from the second side wall;
   a cinch bar having axially spaced first and second end portions and a key portion at the first end portion extending axially away from the second end portion;
   said cinch bar being supportable for rotation on said latch plate sub-assembly between a first position and a second position, said key portion being axially and angularly spaced from said notch when said cinch bar is in said first position and said cinch bar being unremovably supported on said latch plate sub-assembly when said cinch bar is in said first position, said key portion being axially aligned with said notch when said cinch bar is in said second position and said cinch bar being axially slidable between a third position and a fourth position when said cinch bar is in said second position, said key portion being axially spaced from said notch and said cinch bar being supported for rotation on said latch plate sub-assembly when said cinch bar is in said third position, said key portion being disposed within said notch and said cinch bar being unsupported for rotation on said latch plate sub-assembly when said cinch bar is in said fourth position; and
   a length of seat belt webbing being disposed between said cinch bar and said latch plate sub-assembly when said cinch bar is supported on said latch plate sub-assembly, said cinch bar being prevented from rotating to said second position when said seat belt webbing is disposed between said cinch bar and said latch plate sub-assembly.

* * * * *